June 23, 1942.  S. L. ONG  2,287,531
ARTICLE CARRIER
Filed May 6, 1941  2 Sheets-Sheet 2
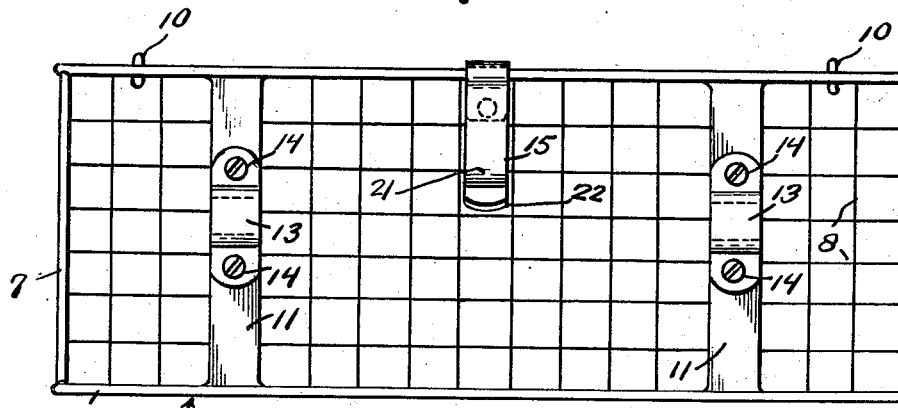
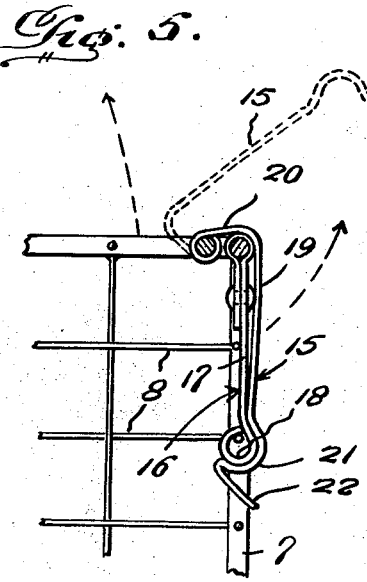
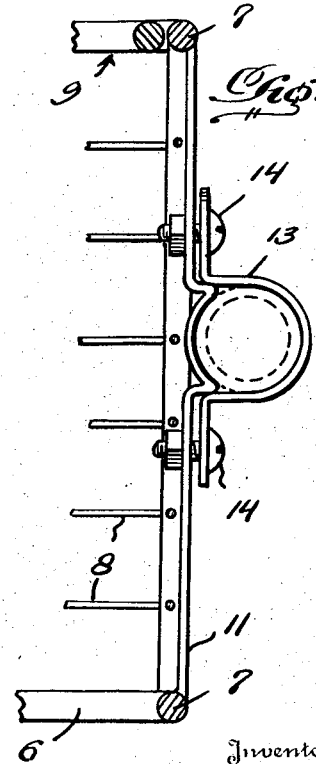
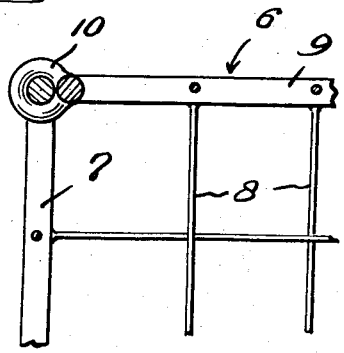
Inventor
Sam Lee Ong,
By McMorrow & Berman
Attorneys Patented June 23, 1942

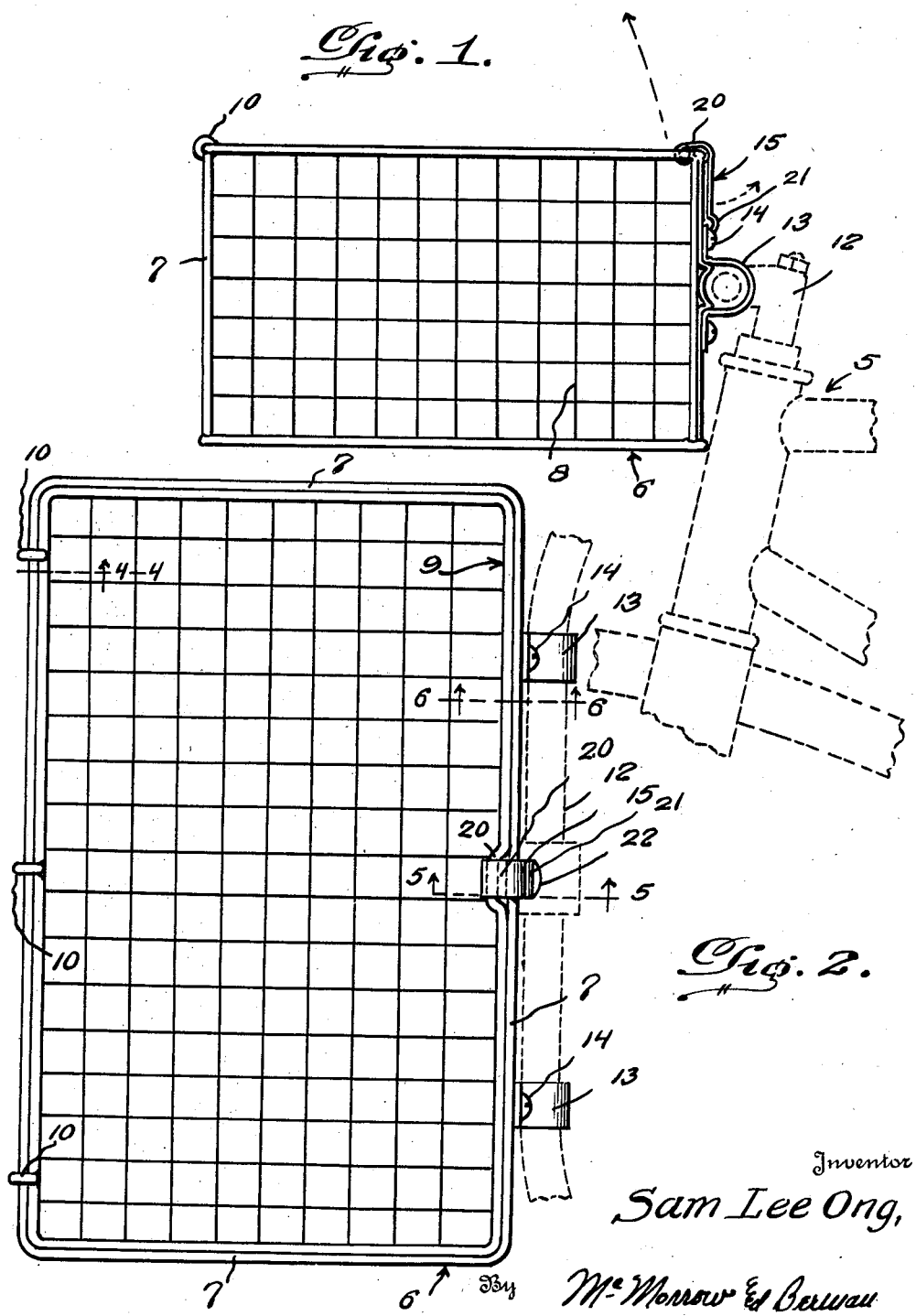

2,287,531

UNITED STATES PATENT OFFICE 2,287,531

ARTICLE CARRIER

Sam Lee Ong, San Mateo, Calif.

Application May 6, 1941, Serial No. 392,190

1 Claim. (Cl. 224—36)

This invention relates to article carriers and more particularly to a basket type carrier especially adapted for use on bicycles, motorcycles, and the like, in which a large number of articles may be accommodated for safe transportation on the bicycle or similar device, consequently permitting the latter to be successfully employed for economical and quick delivery of merchandise by stores or other establishments.

Another object of this invention is the provision of a device of the above stated character which will be capable of withstanding excessive loads and still be light in weight, compact and economical to manufacture and is of a construction wherein the articles of merchandise may be easily and quickly placed in and removed therefrom and safely kept during the time of transportation or when left unattended while actually making a delivery to the residence of the purchaser.

With these and other objects in view as will become more apparent as the description proceeds, the invention consists in certain novel features of construction, combination and arrangement of parts which will be hereinafter more fully described and claimed.

For a complete understanding of my invention, reference is to be had to the following description and accompanying drawings, in which Figure 1 is a side elevation illustrating a carrier constructed in accordance with my invention and showing the same applied to a fragmentary portion of a bicycle.

Figure 2 is a top plan view illustrating the device.

Figure 3 is a rear elevation illustrating the carrier removed from the bicycle.

Figure 4 is a detail sectional view taken on the line 4—4 of Figure 2.

Figure 5 is a detail sectional view taken on the line 5—5 of Figure 2.

Figure 6 is a detail sectional view taken on the line 6—6 of Figure 2.

For the sake of illustration of the present invention, I have elected to show the same applied to a bicycle, a fragmentary portion of which is indicated by the character 5. However, it is to be understood that the application of this invention to a motorcycle or similar device can be easily carried out.

Referring in detail to the drawings, the numeral 6 indicates a basket type carrier including a skeleton frame 7 of substantially rectangular shape, the walls of which are closed by a woven wire construction 8 and further includes a lid or closure 9 also of skeleton formation and of woven wire material. Normally the lid forms the top wall of the basket type carrier 6 and is hinged thereto by providing loops or eyes 10 which encircle one of the upper bars of the skeleton frame 7 and are integral with one of the bars of the cover 9.

The skeleton frame 7 further includes vertically arranged plate-like members 11 which act as reinforcements to one vertical side of the basket and also part of attaching mediums for the basket onto the handle bars 12 of the bicycle 5. The plate-like members 11 intermediate their ends are provided with offsets to partly receive the handle bars and coact with substantially U-shaped brackets 13 placed about the handle bars and detachably secured onto the plate-like members as shown at 14. This construction permits the easy and quick application of the carrier type basket onto a bicycle or similar device and so positions the carrier as not to interfere with the normal riding of the bicycle and further locates the carrier at such a position on the bicycle that the carrier may be constructed of considerable size to provide a large interior area thereto in which a large number of articles of merchandise can be conveniently packed for transportation.

The walls of the carrier as well as the lid therefor being of woven wire construction permits the carrier to be self-cleaning of dirt and other foreign matter as well as providing plentiful ventilation to the interior thereof.

The lid 9 is provided with a spring catch 15 cooperative with a keeper 16 in releasably securing the lid in a closed position. The lid thus held in a closed position is extremely easy to open and close, still it will prevent when in a closed position accidental displacement of any merchandise that may be located within the carrier.

The keeper 16 includes a shank 17, one end of which is bent into loop formation to receive one of the upper bars of the frame 7, as clearly shown in Figure 5. The other end portion of the keeper is bent upon itself to provide a rounded portion 18.

The spring catch 15 includes a shank 19, an end portion of which is offset, as shown at 20, and bent to form a loop to encircle one of the bars of the frame which go to make up the lid 9, this portion of the bar being offset, as shown at 21, preventing the spring catch from sliding endwise of said bar on the lid still permitting the spring catch to have a hinging movement. The other end portion of the spring catch is bent to form a semi-circular shaped part 21 terminating in an offset finger portion 22. The semi-circular shaped portion 21 is adapted to snap over and snugly fit the portion 18 of the keeper to releasably secure the spring catch and consequently releasably secure the lid in a closed position, it only being necessary to free the lid to disengage the spring catch from the keeper by applying pressure on the finger piece 22 in an upward direction.

Whenever it is desirable to secure the articles within the carrier against theft a padlock or the equivalent thereto may be brought about one of the bars of the lid and one of the bars of the carrier.

With reference to the drawings and the foregoing description it will be seen that a very efficient, compact and durable carrier unit has been provided capable of withstanding excessive loads and the accommodation of a large number of articles of merchandise may be had therein and the unit is extremely simple to install on a bicycle or like conveyance. Further, it will be seen that the construction of this device is such that the articles of merchandise can be easily and quickly placed therein and removed and kept safely during the time of transportation or at the time of actually delivering the articles to the purchasers at their residence or similar places.

While I have specifically stated that this device is useful in the delivery of merchandise, it may be also employed by bicyclists or motorcyclists in carrying luggage and other equipment.

While I have shown and described the preferred embodiment of my invention, it will be understood that minor changes in construction, combination and arrangement of parts may be made without departing from the spirit and scope of the invention as claimed.

Having thus described the invention, what I claim is:

In a carrier for bicycles, a receptacle including a frame having upper and lower bars to each vertical wall thereof, spaced rigid flat members extending between and joined to the upper and lower bars of one of the vertical walls of the receptacle to reinforce the frame and each bent substantially intermediate its ends to form a seat for handle bars of a bicycle locating the receptacle above and below the plane of the handle bars with one of the lower bars of the receptacle frame resting against the frame of the bicycle, and substantially U-shaped clamps placed about and tightly engaging the handle bars and detachably secured to the members at opposite sides of the seats.

SAM LEE ONG.